United States Patent
Drerup et al.

(10) Patent No.: US 7,668,996 B2
(45) Date of Patent: Feb. 23, 2010

(54) METHOD OF PIGGYBACKING MULTIPLE DATA TENURES ON A SINGLE DATA BUS GRANT TO ACHIEVE HIGHER BUS UTILIZATION

(75) Inventors: Bernard C. Drerup, Austin, TX (US); Richard Nicholas, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 11/877,296

(22) Filed: Oct. 23, 2007

(65) Prior Publication Data

US 2009/0106465 A1   Apr. 23, 2009

(51) Int. Cl.
*G06F 13/36* (2006.01)
*G06F 13/00* (2006.01)
*H04L 12/28* (2006.01)

(52) U.S. Cl. .................... 710/113; 710/34; 710/35; 370/232; 370/393

(58) Field of Classification Search ............ 710/34, 710/35; 370/232, 393
See application file for complete search history.

(56) References Cited

U.S. PATENT DOCUMENTS

| | | | |
|---|---|---|---|
| 5,640,518 A * | 6/1997 | Muhich et al. ............ 710/110 |
| 5,951,668 A * | 9/1999 | Arimilli et al. ........... 710/309 |
| 6,694,417 B1 * | 2/2004 | Liao et al. ................ 711/170 |
| 7,093,058 B2 * | 8/2006 | Angsburg et al. ......... 710/317 |
| 7,395,361 B2 * | 7/2008 | Schaffer et al. ........... 710/116 |
| 7,519,054 B2 * | 4/2009 | Varma ..................... 370/388 |
| 2009/0106466 A1 * | 4/2009 | Drerup et al. ............. 710/117 |

OTHER PUBLICATIONS

IBM—64-Bit Processor Local Bus, Architecture Specifications Version 3.5; May 2001, 122 pages.*

* cited by examiner

*Primary Examiner*—Mark Rinehart
*Assistant Examiner*—Brian T Misiura
(74) *Attorney, Agent, or Firm*—Matthew B. Talpis; Dillon & Yudell, LLP

(57) ABSTRACT

An improved method, device and data processing system are presented. In one embodiment, the method includes a source device sending a request for a bus grant to deliver data to a data bus connecting a source device and a destination device. The device receives the bus grant and logic within the device determines whether the bandwidth of the data bus allocated to the bus grant will be filled by the data. If the bandwidth of the data bus allocated to the bus grant will not be filled by the data, the device appends additional data to the first data and delivers the combined data to the data bus during the bus grant for the first data. When the bandwidth of the data bus allocated to the bus grant will be filled by the first data, the device delivers only the first data to the data bus during the bus grant.

20 Claims, 9 Drawing Sheets

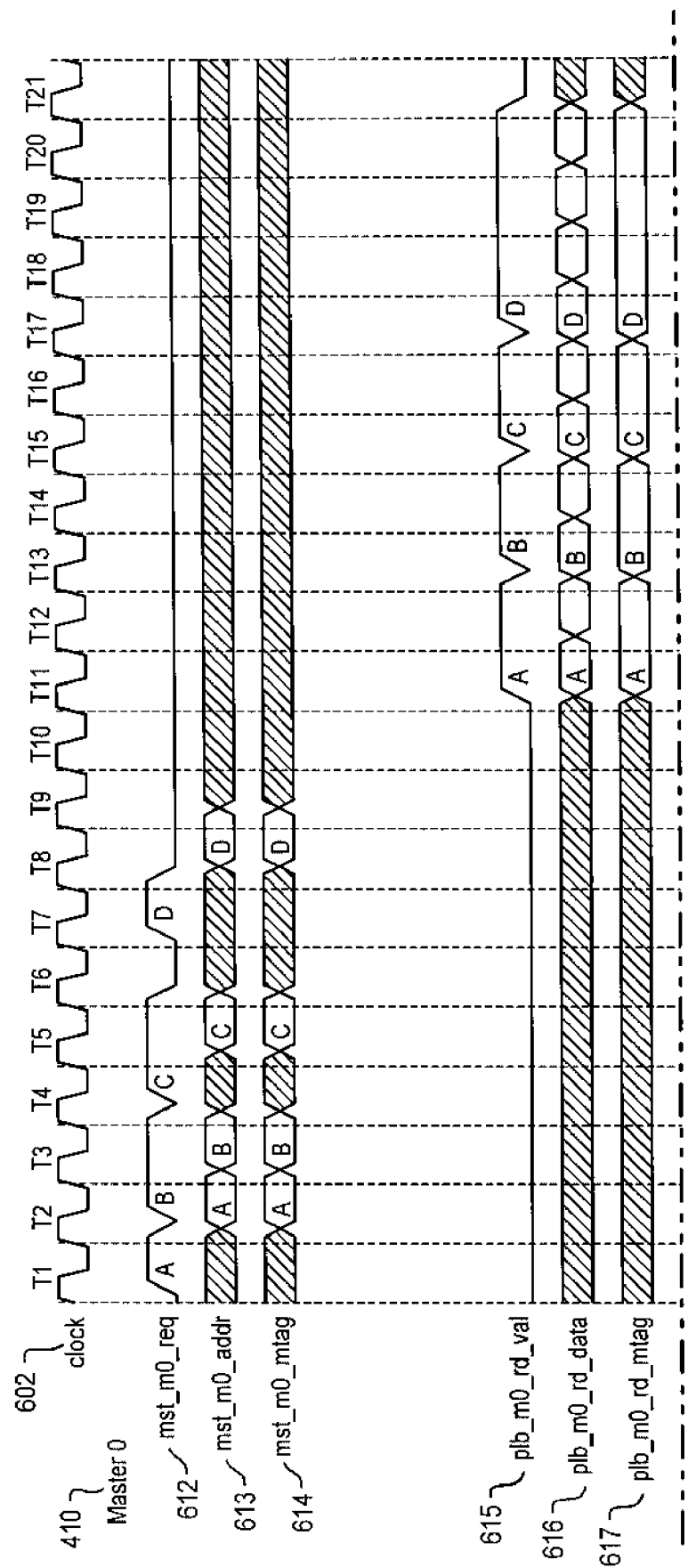

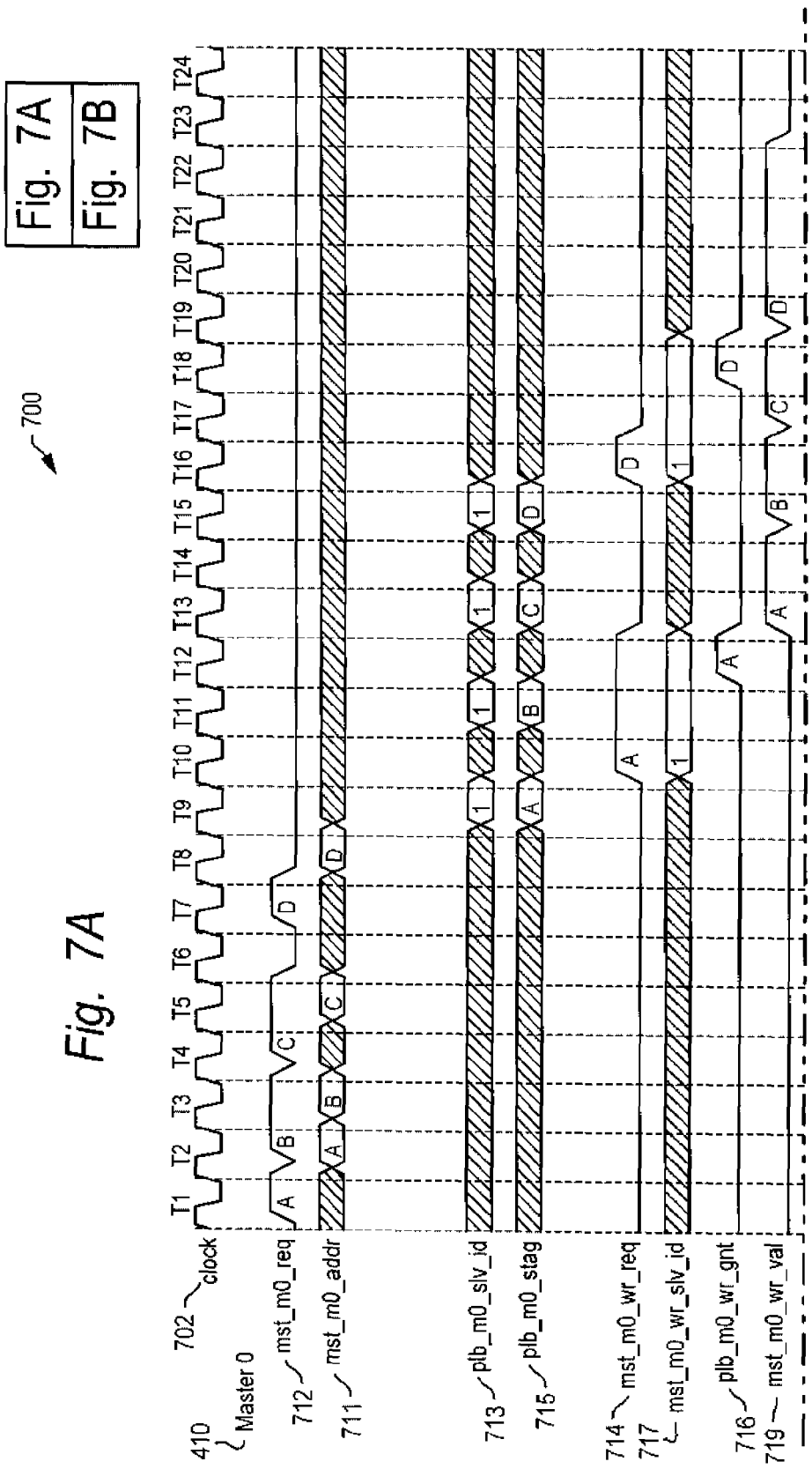

METHOD OF PIGGYBACKING MULTIPLE DATA TENURES ON A SINGLE DATA BUS GRANT TO ACHIEVE HIGHER BUS UTILIZATION

BACKGROUND OF THE INVENTION

1. Field of the Invention

The present invention relates in general to the field of computers and similar technologies, and in particular to data transmission over bus lines utilized in this field. Still more particularly, the present invention relates to utilization of bus bandwidth for requests to use the data bus via a request/grant protocol.

2. Description of the Related Art

In computer architecture, a bus is a collection of related signal lines that transfer information (e.g. addresses and data) between components of a computer system. Unlike a point-to-point connection, a bus can logically connect several devices over the same set of signal lines. Typically, a computer system will have separate buses for transmitting different types of signals. A control bus carries commands from master devices and returns status signals from slave devices. A data bus is used to read data from and write data to another device on the bus. An address bus is used for communicating the physical addresses of computer memory elements and locations which the requesting device (master) wants to access. Access to a bus is controlled by a bus arbiter executing a bus protocol. A device submits a request to access the bus. When the bus arbiter grants the request, the requesting device may begin receiving data from the bus or writing data to the bus. Some architectures have a single arbiter with which a master arbitrates for the control bus, the address bus and the data bus at the same time. A single bus grant allows the master to make a request and deliver or receive data. Other architectures have separate arbiters for the control bus, address bus and data bus. Having separate arbiters allows data transactions to queue up and data to be delivered separately and independently from the command requests. In system-on-a-chip (SoC) designs, primary components of a computer system are integrated into a single integrated circuit (chip). The components of a SoC design are connected by on-chip buses.

The normal data flow for a read request is as follows. The master issues a read request which is accepted and queued by a slave. When the slave has some or all of the data ready to return, the slave requests access to the read data bus. When the slave receives the grant for the read data bus, the slave returns the data for that transaction. Alternatively, the slave may return part of the data for that transaction and then request the data bus again to return more (or the rest) of the data for that transaction.

For a bus operating at high frequencies (e.g., 400 MHz and greater), the best turnaround time that can easily be achieved between a data bus request and a data bus grant (without a custom solution) is typically two clock cycles. In other words, if a device asserts a request on clock i, the earliest the device can expect a grant is on clock i+2. This delay occurs because the request and the grant must be "latched" into and out of an arbiter at those frequencies and each latching event takes one clock. Since the grant signal must be latched into the device providing the data, it then follows that the earliest the device can begin driving data on the bus is on clock i+3. This cadence allows efficient use of the data bus, provided that data bus tenures are three or more beats in length. A data bus tenure ("data tenure") is the signaling with which a device writes data to the data bus in response to a granted bus request. As long as a request is made for the next transaction while there are three or more beats of data remaining to be delivered on the current transaction, a grant can be provided on the last beat of the current transaction, allowing that device to start driving its data on the next clock. There will be no gaps or stalls on the data bus, allowing the bandwidth of the bus to be fully utilized. However, when multiple transactions in a row are returned with data tenures that are only one or two beats, the bandwidth of the data bus will not be fully utilized. There will be gaps in data transmission as the bus is idle awaiting the next grant. This reduces the overall efficiency of the data bus.

SUMMARY OF THE INVENTION

To address the issues described above, an improved method, device and data processing system are presented. In one embodiment, the method includes a source device sending a request for a bus grant to deliver data to a data bus connecting a source device and a destination device. The device receives the bus grant to deliver the data to the data bus in response to the request. Logic within the device determines whether the bandwidth of the data bus allocated to the bus grant will be filled by the data (bandwidth is the number of clock cycles allocated to the bus grant). If the bandwidth of the data bus allocated to the bus grant will not be filled by the data, the device appends additional data to the first data ("combined data") and delivers the combined data to the data bus during the bus grant for the first data. When the bandwidth of the data bus allocated to the bus grant will be filled by the first data, the device delivers only the first data to the data bus during the bus grant. The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

The present invention provides a method and system for "piggybacking" multiple data tenures on a single data bus grant to achieve higher bus utilization. In one embodiment, a slave device that has queued up multiple read requests is allowed to deliver the data for two or more separate requests on the same data bus grant. In particular, this is done when the requested data tenures are shorter in duration than the total number of beats required to fill the data bus for successive bus grants so that the bus is not idle awaiting the next grant.

Figure 1:
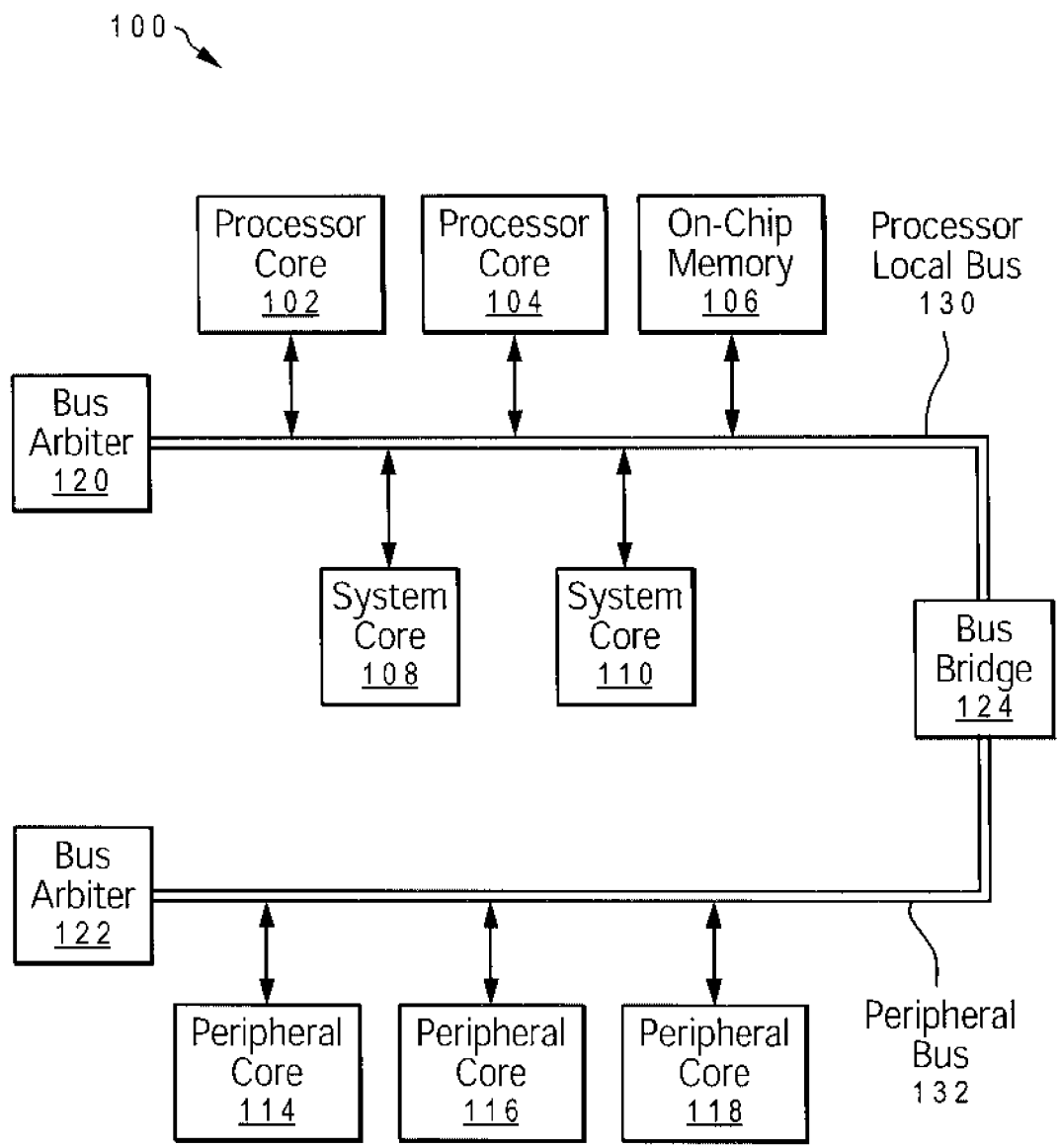
FIG. 1 depicts an exemplary computer architecture in which the present invention may be implemented.

With reference now to the figures, and in particular to FIG. 1, a block diagram is shown depicting an exemplary architecture for data processing system 100 in which the present invention may be implemented. Processor local bus 130 is a high-speed bus that connects processor cores 102-104 with other high-speed devices, such as on-chip memory 106. System 100 also includes system cores 108 and 110. Peripheral bus 132 connects slower peripheral cores 114-118. Data is exchanged between peripheral bus 132 and processor local bus 130 by bus bridge 124. Device access to processor local bus 130 is determined by bus arbiter 120. Device access to peripheral bus 132 is determined by bus arbiter 122. Processor local bus 130 and peripheral bus 132 each include an address/control bus, a read data bus and a write data bus. In a preferred embodiment, the address/control bus, the read data bus and write data bus of processor local bus 130 and peripheral bus 132 all have separate arbiters. This enables the read and write data buses to be arbitrated for independently from the command arbitration. Thus the number of data tenures need not match the number of command tenures. A command tenure is signaling with which a master device initiates a transaction by providing address information and control information like transaction type (read or write) and transaction size (number of bytes) to the target slave device. When the data for some commands is piggybacked with the data for other commands, there will be less data tenures than command tenures. The bus protocol and the bus controller implementation keep no associations between the command tenure and the data tenure of a transaction.

High-speed buses, such as processor local bus 130, typically run at speeds equal to 400 MHz or higher. At clock frequencies 400 MHz or higher, the best turnaround time that can easily be achieved between a data bus request and a data bus grant is two clock cycles. It will take an additional cycle before data can be delivered to the bus. As discussed above, data tenures that are shorter in duration than the total number of beats required to fill the data bus for successive bus grants will cause idles in the data bus while the requesting device waits for the next bus grant. The bandwidth of the data bus will therefore not be fully utilized, as is demonstrated in the following figures.

Figure 2:
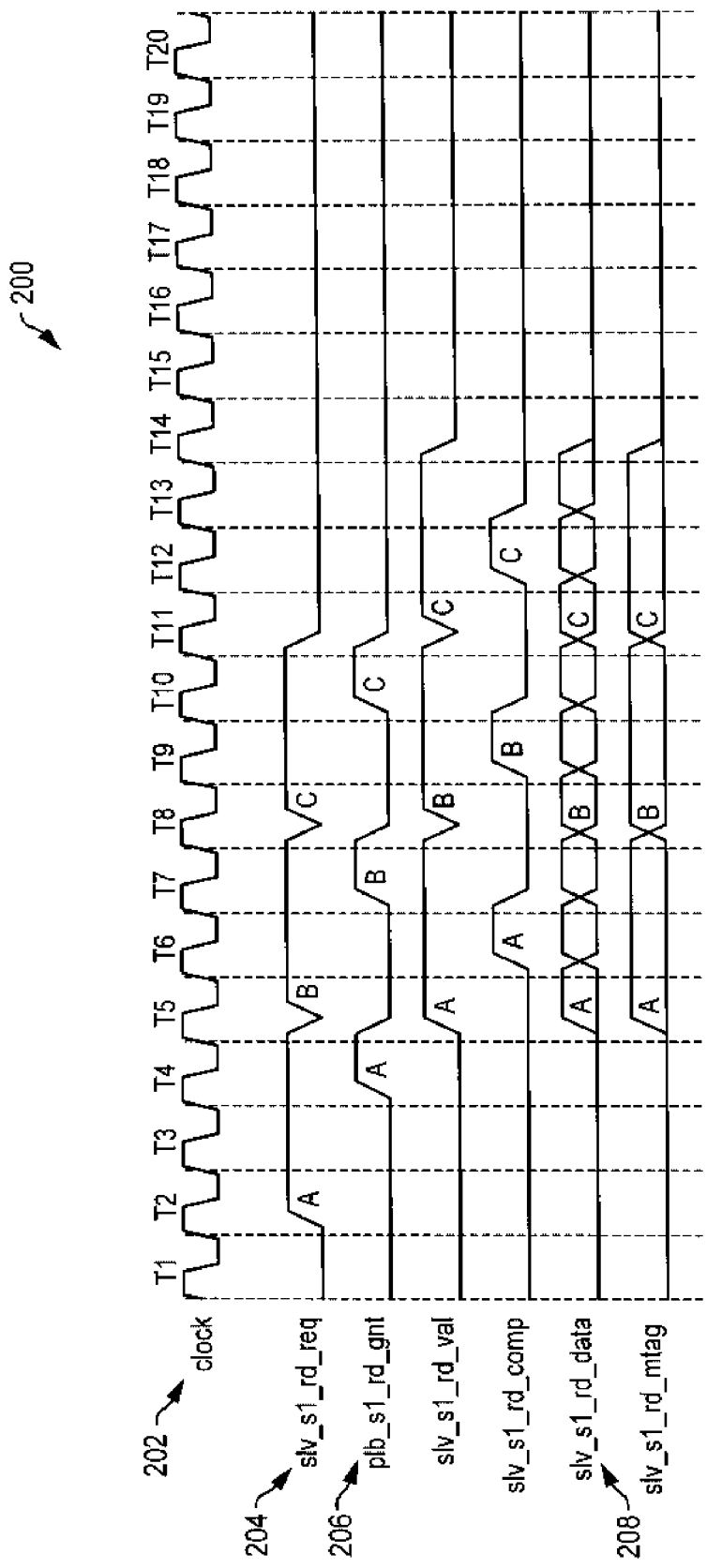
FIG. 2 depicts a timing diagram of a conventional implementation that demonstrates a fully utilized data bus when data packets are three or more beats in length.

With reference now to FIG. 2, timing diagram 200 of a conventional implementation is shown that demonstrates a fully utilized data bus when data tenures are (in this example) three or more beats in length. Clock trace 202 at the top of the diagram corresponds to the clock signal, where each clock interval T1-T20 represents a single clock cycle. The traces shown beneath clock trace 202 indicate the signals on particular bus lines between clock T1 and clock T20. In this example, a slave device is making requests A, B and C to deliver data to the data bus. At clock T2, the slave device makes request A (trace 204). The earliest the slave will receive a grant is two clock cycles later, shown on trace 206 at clock T4. The slave can begin delivering data to the bus one clock cycle later at clock T5 (trace 208). Three clock cycles (T2-T5) elapsed between the bus request and the slave delivering data to the bus. As shown here on trace 208, the data tenure for each request A-C is at least three beats in duration. Therefore, each bus request can be granted and data can be delivered before the data bus becomes idle waiting for a grant. However, as seen in the next figure, when the data tenures are less than three beats the data bus becomes idle waiting for the next grant.

Figure 3:
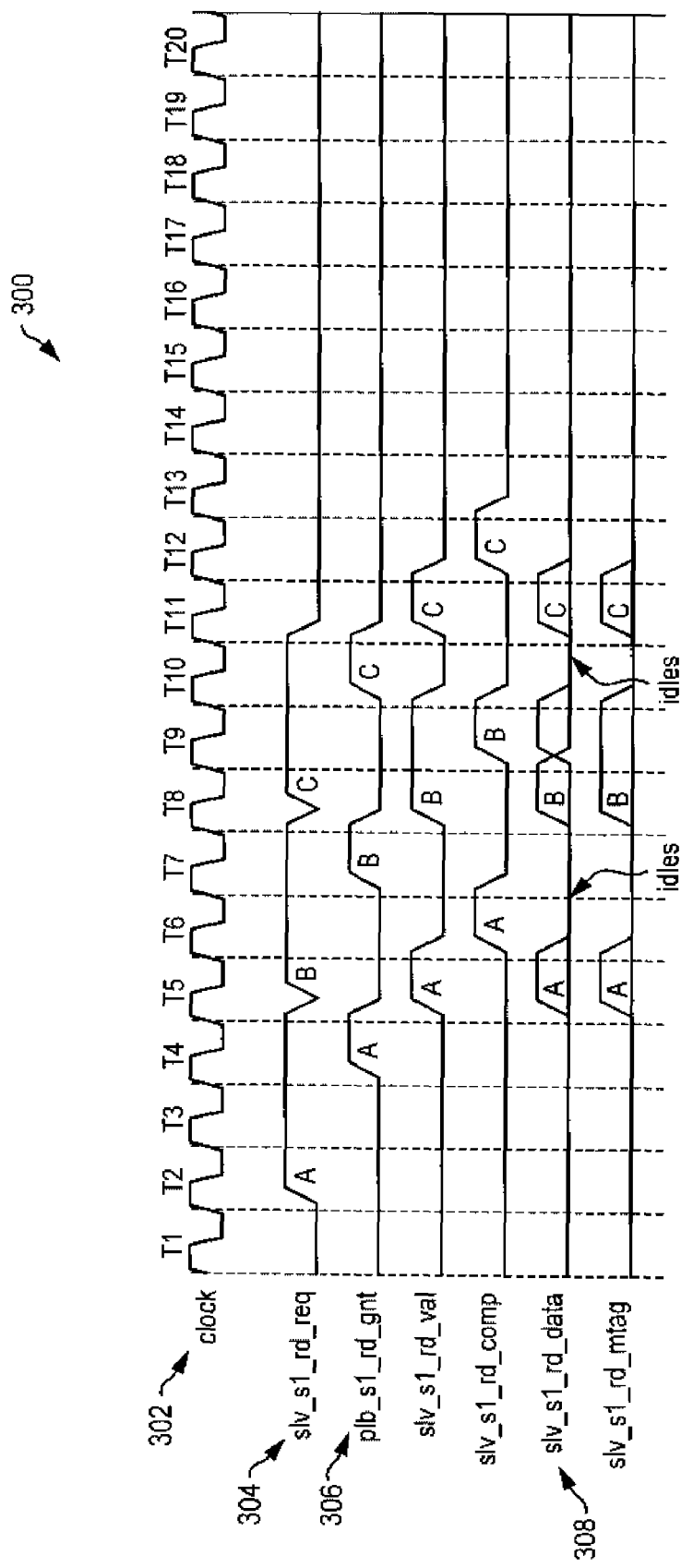
FIG. 3 depicts a timing diagram of a conventional implementation that demonstrates gaps or idles on the data bus when data packets are one or two beats in length.

With reference now to FIG. 3, timing diagram 300 of a conventional implementation is shown that demonstrates gaps or idles on the data bus when data packets are one or two beats in length. In this example, a slave device is again making requests A, B and C to deliver data to the data bus. At clock T2, the slave device makes request A (trace 304). The earliest the slave will receive a grant is two clock cycles later, shown on trace 306 at clock T4. The slave can begin delivering data to the bus one clock cycle later at clock T5 (trace 308). Three clock cycles (T2-T5) elapsed between the bus request and the slave delivering data to the bus. As shown here on trace 308, the data tenure for request A is only one beat in duration, ending with clock T5. However, request B is also made on clock T5 (trace 304) and three clock cycles elapse before the data for request B can start to be delivered (trace 308, at clock T8). Therefore, the data bus is idle on clocks T6 and T7 (trace 308). Similarly, the data tenure for request B is only two beats in duration, ending with clock T9. Request C is made on clock T8 (trace 304) and three clock cycles elapse before the data for request C can start to be delivered (trace 308, at clock T11). Therefore, the data bus is idle on clock T10 (trace 308). It is an object of the present invention to improve bus efficiency by eliminating these idles on the data bus.

Figure 4:
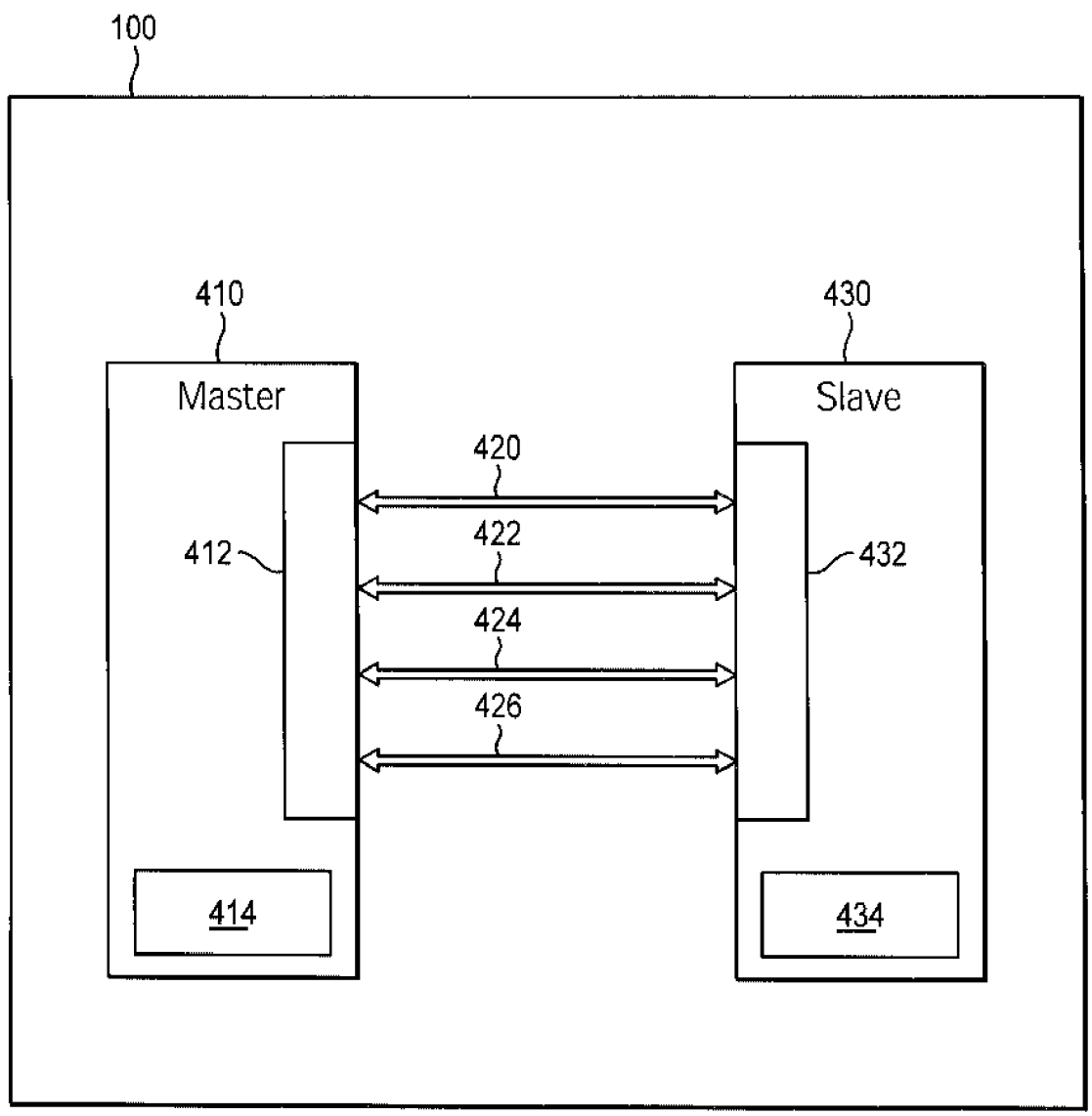
FIG. 4 depicts a high level block diagram of a master device and slave device interconnected by a bus within the exemplary computer architecture of FIG. 1.

With reference now to FIG. 4, a high level block diagram of a master device and slave device interconnected by a bus within the exemplary computer architecture 100 of FIG. 1 is shown. Master 410 and slave 430 exchange data with each other via bus lines 420-426. Note that, while not shown in FIG. 4, other master and slave devices can utilize these same bus lines. Address bus 420 is used by master 410 to specify a memory location in slave 430. Control bus 422 is used by each device to issue commands to each other. Data read bus 424 is used by slave 430 so send data to master 410. Data write bus 426 is used by master 410 to send data to slave 430. Master 410 includes logic 412, which controls the flow of data in master 410. Slave 430 includes logic 432, which controls the flow of data in slave 430. Master 410 includes buffer 414, which can temporarily store data in master 410. Slave 430 includes buffer 434, which can temporarily store data in slave 430.

Figure 5:
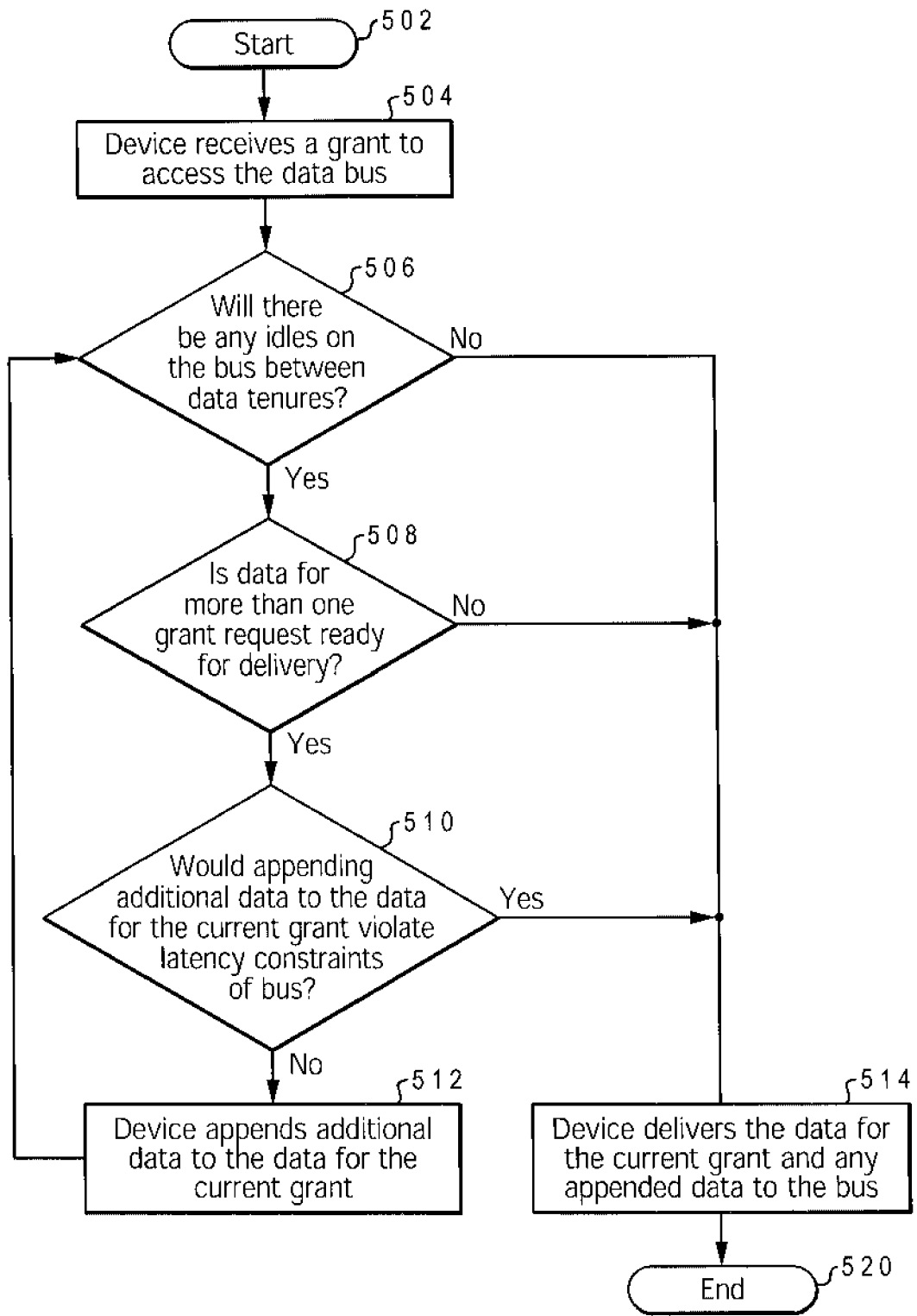
FIG. 5 depicts a flowchart that demonstrates a method for "piggybacking" data tenures for multiple bus requests on a single bus grant.

With reference now to FIG. 5, flowchart 500 is shown which demonstrates a method for "piggybacking" data tenures for multiple read requests on a single bus grant. The process starts at initiator block 502. Either master 410 or slave 430 receives a grant to deliver data to a bus that connects those devices (step 504). Logic within the device determines whether there will be any idles on the bus between data tenures (step 506). If there will be idles, then logic within the device determines if data for more than one grant request is ready for delivery to the bus (508). If data for more than one grant request is ready, logic within the device determines whether appending ("piggybacking") additional data to the data for the current grant will violate the latency constraints of the bus (step 510). The latency constraints are described in further detail below with regard to FIG. 6. If piggybacking will not violate the latency constraints of the bus, then the device appends the additional data to the data for the current grant (step 512). The appended data and the original data for the grant are hereinafter referred to as "combined data". The process then returns to step 506 and repeats the process from that point to see if any further piggybacking can be done. Once the device determines that no further piggybacking of data can be done, the device delivers the combined data to the bus (step 514) and the process ends at terminator block 520.

The decision to piggyback is made when delivering the data. The decision does not have to be made up front (before the request is made) via a command from the master to deliver combined data. The master can issue several requests for data from a slave, and logic within the slave device determines whether data for the requests will be piggybacked on to one bus grant. Piggybacking combines any group of reads or writes for transport purposes only and the destination observes the transactions as separate. The present invention is therefore not limited to combining only transactions with adjacent addresses, but can combine any group of pending reads or writes that are ready for delivery.

Figure 6B:
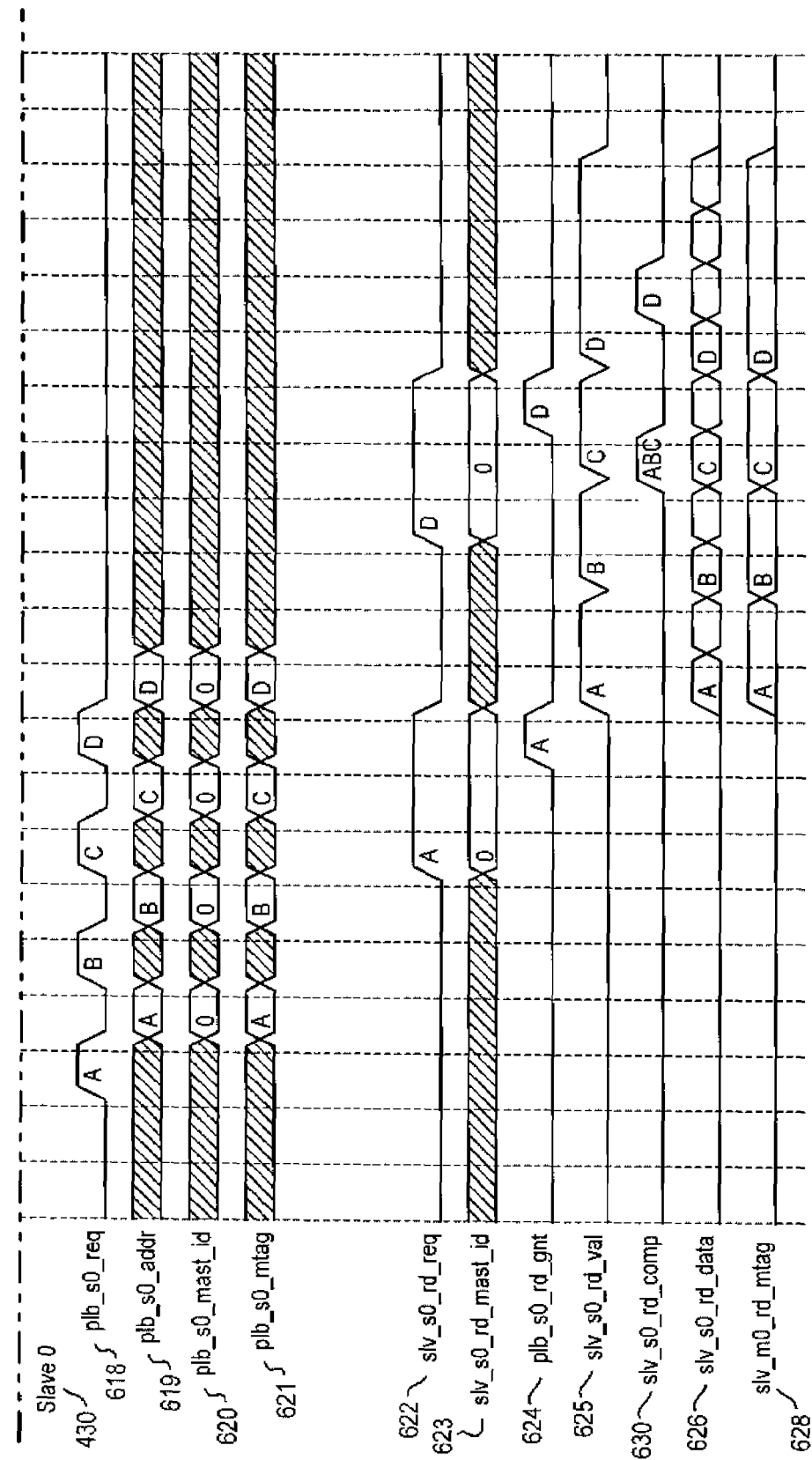
FIG. 6 depicts a timing diagram that demonstrates "piggybacking" data from a slave device for read requests A, B and C on a single bus grant.

With reference now to FIG. 6, a timing diagram 600 is shown that demonstrates "piggybacking" data tenures for read requests A, B and C on a single bus grant. Clock trace 602 at the top of the diagram corresponds to the clock signal, where each clock interval T1-T21 represents a single clock cycle. The traces shown beneath clock trace 602 indicate the signals on particular bus lines between clock T1 and clock T21. In this example, a master device (master 410) is reading data from a slave device (slave 430). Master 410 makes read requests A, B, C and D (trace 612 at clocks T1-T7) to bus arbiter 120. Master 410 specifies the addresses for read requests A, B, C, and D (trace 613 at clocks T2-T8) and sets a tag ("mtag") that identifies each read request (trace 614 at clocks T2-T8). This tag is used to identify which data belongs to a particular request when piggybacking of data takes place, and is discussed in further detail below. Bus arbiter 120 receives the read requests from master 410, and requests makes requests A, B, C, and D to slave 430 (trace 618 at clocks T3-T9). The read requests are accompanied by the addresses from which data is to be read (trace 619 at clocks T4-T10), the ID number of the requesting master device (trace 620 at clocks T4-T10), and the tags associated with the requests (trace 621 at clocks T4-T10). After slave 430 has queued the data for read request A, slave 430 requests the data bus (trace 622 at clock T7) to return the data and identifies master 410 as the destination (trace 623 at clock T7). By the time bus arbiter 120 issues the data bus grant to slave 430 two cycles later (trace 624 at clock T9), slave 430 has also queued the data for read request B, since it is only two beats in length. Slave 430 piggybacks the data for B right after the data for A (trace 626 at clocks T12-T13). But before slave 430 has returned the data for B, it has queued transaction C. So, in this case, slave 430 tacks on the read data for C right after the read data for B (trace 626 at clocks T14-T15). The read data for A, B and C all piggyback on the same data bus grant (the grant for request A on trace 624 at clock T9). As a result, there are no gaps (idle clocks) on trace 626 between data tenures A, B and C. Without the piggybacking there would be a minimum of one idle clock between those data tenures. Slave 430 sends a data complete ("comp") signal (trace 630) signifying the completion of delivery of the data for A, B and C. The assertion of the comp signal indicates that the delivery of data is complete and enables bus arbiter 120 to grant the data bus to another device or transaction. The comp signal is asserted one clock before the final data beat, but at least one clock after the first data beat. For busses operating at slower frequencies, the comp signal may be able to be asserted as early as the first data beat. But for busses operating at higher frequencies, the comp signal needs to be asserted no earlier than one clock after the first data beat. As shown in trace 630, the comp signal is asserted one clock before the final beat of the data for C in trace 626. As slave 430 delivers data to the data bus, slave 430 asserts a data valid ("val") signal to indicate that valid data is being delivered to the data bus (trace 625 at clocks T10-T20).

According to one embodiment, the number of piggybacked transactions should be limited such that the combined number of clocks to return the piggybacked data does not exceed the maximum number of clocks allowed for the largest single transaction on the data bus. For example, if the largest single read data tenure supported on the bus is 128 bytes (8 clocks), then the total number of clocks for multiple piggybacked tenures cannot exceed 8. Four, two-beat transactions can be piggybacked on a single data bus grant for example. This constraint is needed to maintain acceptable latency on the bus. Without such a constraint, then a slave could lock out all other slaves on the same slave segment for an unspecified period of time.

The data for read request D is returned on a separate grant (624 at clock T15), because returning D on the same grant would violate the latency rule discussed above. In this example, a transaction on a single grant is limited to eight clocks. This transaction began on clock T10 and must end on clock T17. The data for read requests A, B and C last for six beats (two beats each), ending on clock T15. The data for read request D is four beats long and cannot be piggybacked. However, since the data for requests A, B and C are piggybacked in one transaction, slave 430 does not have to issue separate requests to deliver B and C and can issue a request for D as soon as the data for D is queued. Alternatively, slave 430 issues separate read requests to deliver B and C, but either ignores or cancels the requests. In effect, piggybacking extended the transaction prior to the grant of D to six beats in length (instead of two). As a result, the data bus is not idle between the request and grant of D.

There will be no confusion at the destination device (e.g., a master or slave device) as to where the data for one transaction ends and where the data for the next transaction starts because the two data tenures are distinguished by different tags, shown for example as "mtag" in trace 628. These tags identify which transaction the data belongs to (A, B, C or D) and allows data to be delivered out of sequence. The destination device does not need to be aware that this piggybacking has occurred. For practical purposes the interconnect (which must route each data tenure to the correct destination device) would be likely to only support piggybacked data tenures if they are destined for the same destination device, although it is possible for an interconnect to more broadly support piggybacked data tenures to different destination devices. If the interconnect supports piggybacked data destined for multiple destination devices, the source device would have to output an additional "destination tag" that "rides" along with the data so that the interconnect would know how to route the different tenures. Typically the routing information to the destination device is implicit at the time the data bus is granted. However, if the route to the destination device is associated with the grant, then all of the data associated with that grant (even multiple tenures) would need to go to the same destination device.

The bus protocol and the bus controller implementation keep no associations between the command tenure and the data tenure of a transaction. Thus the number of data tenures need not match the number of command tenures. To keep no associations between the data and command tenures, the read and write data buses are arbitrated for independently from the command arbitration (i.e., separate arbiters, separate request/grant signals).

Figure 7B:
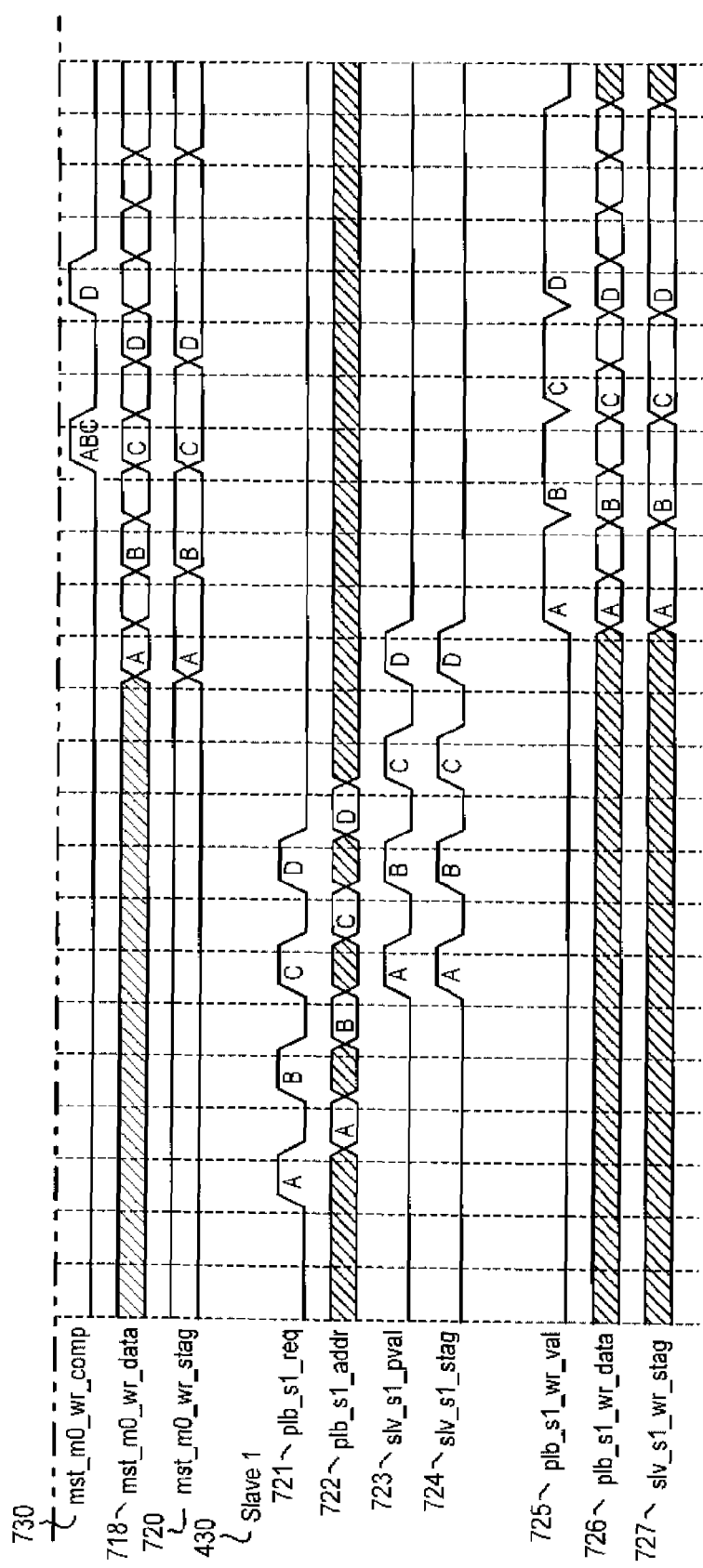
FIG. 7 depicts a timing diagram that demonstrates "piggybacking" data from a master device for write requests A, B and C on a single bus grant.

With reference now to FIG. 7, a timing diagram is shown that demonstrates "piggybacking" data for write requests A, B and C on a single bus grant. In this example, master 410 is requesting access to the bus to write data to slave 430. Clock trace 702 at the top of the diagram corresponds to the clock signal, where each clock interval T1-T24 represents a single clock cycle. The traces shown beneath clock trace 702 indicate the signals on particular bus lines between clock T1 and clock T24. In this example, a master device (master 410) is writing data to a slave device (slave 430). Master 410 makes write requests A, B, C and D to bus arbiter 120 (trace 712 at clocks T1-T7) and specifies the address of each write (trace 711 at clocks T2-T9). Bus arbiter 120 makes write requests A, B, C and D to slave 430 (trace 721 at clocks T3-T10) and specifies the address of each write (trace 722 at clocks T4-T11). Slave 430 signals to bus arbiter 120 when it is ready to receive the write data (trace 723 at clocks T7-T14) and sets a tag ("stag") that identifies each write (trace 724 at clocks T4-T11). Bus arbiter 120 returns the tags to master 410 (trace 715 at clocks T9-T16) and the ID number of slave 430 (trace 713 at clocks T9-T16). After master 410 has queued the data for write request A, master 410 requests the data bus (trace 714 at clock T10) to write the data to slave 430. By the time bus arbiter 120 issues the data bus grant two cycles later (trace 716 at clock T12), master 410 has also queued the data for write request B, since it is only two beats in length. Master 410 piggybacks the data for B right after the data for A (trace 718 at clocks T13-T17). But before master 410 has returned the data for B, it has queued transaction C. So, in this case, master 410 appends the data for C to the end of data for B (trace 718 at clocks T17-T19). The data for A, B and C all piggyback on the same data bus grant (the grant for request A on trace 716 at clock T12). As a result, there are no gaps (idle clocks) on trace 718 between data tenures A, B and C. Without the piggybacking there would be a minimum of one idle clock between those data tenures. Master 410 sends a data complete ("comp") signal (trace 730) signifying the completion of delivery of the data for A, B and C. The assertion of the comp signal indicates that the delivery of data is complete and enables bus arbiter 120 to grant the data bus to another device or transaction. The comp signal is asserted one clock before the final data beat, but at least one clock after the first data beat. For busses operating at slower frequencies, the comp signal may be able to be asserted as early as the first data beat. But for busses operating at higher frequencies, the comp signal needs to be asserted no earlier than one clock after the first data beat. As shown in trace 730, the comp signal is asserted one clock before the final beat of the data for C in trace 718. The data for read request D is returned on a separate grant (716 at clock T18), because returning D on the same grant would violate the latency rule discussed above. As master 410 delivers data to the data bus, master 410 asserts a data valid ("val") signal to indicate that valid data is being delivered to the data bus (trace 719 at clocks T13-T23).

While the invention has been described with reference to exemplary embodiments, it will be understood by those skilled in the art that various changes may be made and equivalents may be substituted for elements thereof without departing from the scope of the invention. For example, while the present invention has been described with regard to on-chip buses, it should be understood that at least some aspects of the present invention may be suited for use with any bus in a data processing system and is not limited to only on-chip buses. In addition, many modifications may be made to adapt a particular situation or device to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for maximizing use of a data bus grant, the method comprising:
    sending a first request for a first bus grant to deliver a first data to a data bus connecting a source device and a destination device;
    receiving the first bus grant to deliver said first data to the data bus in response to said first request;
    determining whether a bandwidth of said data bus allocated to the first bus grant will be filled by said first data, wherein said bandwidth is a number of clock cycles allocated to the first bus grant;
    in response to determining that the bandwidth of said data bus allocated to the first bus grant will not be filled by said first data:
        appending a second data to said first data to provide combined data;
        delivering the combined data to said data bus during said first bus grant;
    delivering only said first data to said data bus during said first bus grant when the bandwidth of said data bus allocated to the first bus grant will be filled by said first data;
    determining whether said delivering of the combined data to said data bus during said first bus grant will violate a latency constraint of said data bus; and
    in response to determining that said delivering of the combined data to said data bus during said first bus grant will violate a latency constraint of said data bus, delivering only said first data to said data bus during said first bus grant.

2. The method of claim 1, wherein said appending a second data to said first data to provide combined data further comprises appending data for more than one request to said first data to provide the combined data.

3. The method of claim 1, further comprising:
    sending a second request for a second bus grant to deliver said second data to the data bus;
    determining whether the delivery of said first data for said first bus grant will be complete before said second bus grant can be received;
    in response to determining that delivery of said first data for said first bus grant will be complete before said second bus grant can be received:
        said appending the second data to said first data to provide combined data is performed;
        said delivering the combined data to said data bus during said first bus grant is performed, without waiting for said second bus grant; and
    delivering only said first data to said data bus during said first bus grant when delivery of said first data for said first bus grant will not be complete before said second bus grant can be received.

4. The method of claim 3, further comprising canceling said second request for a second bus grant in response to determining that delivery of said first data for said first bus grant will be complete before said second bus grant can be received.

5. The method of claim 1, wherein said delivering combined data during said first bus grant further comprises identifying said first data of said combined data with a first tag and identifying said second data of said combined data with a second tag, wherein said first and second tags are used to distinguish said first data from said second data at the destination device.

6. The method of claim 1, further comprising keeping no association between a command tenure and a data tenure.

7. A device for maximizing use of a data bus grant, the device comprising:
logic for sending a first request for a first bus grant to deliver a first data to a data bus connecting a source device and a destination device;
logic for receiving the first bus grant to deliver said first data to the data bus in response to said first request;
logic for determining whether a bandwidth of said data bus allocated to the first bus grant will be filled by said first data, wherein said bandwidth is a number of clock cycles allocated to the first bus grant;
logic, responsive to determining that the bandwidth of said data bus allocated to the first bus grant will not be filled by said first data, further comprising:
logic for appending a second data to said first data to provide combined data;
logic for delivering the combined data to said data bus during said first bus grant;
logic for delivering only said first data to said data bus during said first bus grant when the bandwidth of said data bus allocated to the first bus grant will be filled by said first data;
logic for determining whether said delivering of the combined data to said data bus during said first bus grant will violate a latency constraint of said data bus; and
logic, responsive to determining that said delivering of the combined data to said data bus during said first bus grant will violate a latency constraint of said data, for delivering only said first data to said data bus during said first bus grant.

8. The device of claim 7, wherein said logic for appending a second data to said first data to provide combined data further comprises logic for appending data for more than one request to said first data to provide the combined data.

9. The device of claim 7, further comprising:
logic for sending a second request for a second bus grant to deliver said second data to the data bus;
logic for determining whether the delivery of said first data for said first bus grant will be complete before said second bus grant can be received;
logic, responsive to determining that delivery of said first data for said first bus grant will be complete before said second bus grant can be received, further comprising:
said logic for appending the second data to said first data to provide combined data;
said logic for delivering the combined data to said data bus during said first bus grant; and
logic for delivering only said first data to said data bus during said first bus grant when delivery of said first data for said first bus grant will not be complete before said second bus grant can be received.

10. The device of claim 9, further comprising logic for canceling said second request for a second bus grant in response to determining that delivery of said first data for said first bus grant will be complete before said second bus grant can be received.

11. The device of claim 7, wherein said logic for delivering combined data during said first bus grant further comprises logic for identifying said first data of said combined data with a first tag and identifying said second data of said combined data with a second tag, wherein said first and second tags are used to distinguish said first data from said second data at the destination device.

12. The device of claim 7,
wherein said device comprises a master device; and
wherein said first data and second data are associated with a write operation.

13. The device of claim 7,
wherein said device comprises a slave device; and
wherein said first data and second data are associated with a read operation.

14. The device of claim 7, further comprising logic for arbitrating the data bus wherein said logic for arbitrating the data bus keeps no association between a command tenure and a data tenure.

15. A data processing system comprising:
a master device;
a slave device coupled to said master device via a data bus;
logic, within at least one of said master and slave device, further comprising:
logic for sending a first request for a first bus grant to deliver a first data to a data bus connecting a source device and a destination device;
logic for receiving the first bus grant to deliver said first data to the data bus in response to said first request;
logic for determining whether a bandwidth of said data bus allocated to the first bus grant will be filled by said first data, wherein said bandwidth is a number of clock cycles allocated to the first bus grant;
logic, responsive to determining that the bandwidth of said data bus allocated to the first bus grant will not be filled by said first data, further comprising:
logic for appending a second data to said first data to provide combined data;
logic for delivering the combined data to said data bus during said first bus grant;
logic for delivering only said first data to said data bus during said first bus grant when the bandwidth of said data bus allocated to the first bus grant will be filled by said first data;
logic for determining whether said delivering of the combined data to said data bus during said first bus grant will violate a latency constraint of said data bus; and
logic, responsive to determining that said delivering of the combined data to said data bus during said first bus grant will violate a latency constraint of said data, for delivering only said first data to said data bus during said first bus grant.

16. The data processing system of claim 15, wherein said logic for appending a second data to said first data to provide combined data further comprises logic for appending data for more than one request to said first data to provide the combined data.

17. The data processing system of claim 15, further comprising:
logic for sending a second request for a second bus grant to deliver said second data to the data bus;
logic for determining whether the delivery of said first data for said first bus grant will be complete before said second bus grant can be received;
logic, responsive to determining that delivery of said first data for said first bus grant will be complete before said second bus grant can be received, further comprising:
said logic for appending the second data to said first data to provide combined data;
said logic for delivering the combined data to said data bus during said first bus grant; and logic for delivering only said first data to said data bus during said first bus grant when delivery of said first data for said first bus grant will not be complete before said second bus grant can be received.

18. The data processing system of claim 17, further comprising logic for canceling said second request for a second bus grant in response to determining that delivery of said first data for said first bus grant will be complete before said second bus grant can be received.

19. The data processing system of claim 15, wherein said logic for delivering combined data during said first bus grant further comprises logic for identifying said first data of said combined data with a first tag and identifying said second data of said combined data with a second tag, wherein said first and second tags are used to distinguish said first data from said second data at the destination device.

20. The data processing system of claim 15, further comprising one or more bus arbiters, wherein said one or more bus arbiters keep no association between a command tenure and a data tenure.

* * * * *